United States Patent
Kim et al.

(10) Patent No.: US 10,467,987 B2
(45) Date of Patent: Nov. 5, 2019

(54) DISPLAY APPARATUS AND CONTROLLING METHOD THEREOF

(71) Applicant: Samsung Electronics Co., Ltd., Suwon-si (KR)

(72) Inventors: Seok-hyun Kim, Suwon-si (KR); Chang-seog Ko, Hwaseong-si (KR); Jung-geun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 15/469,744

(22) Filed: Mar. 27, 2017

(65) Prior Publication Data

US 2018/0068639 A1 Mar. 8, 2018

(30) Foreign Application Priority Data

Sep. 2, 2016 (KR) .................. 10-2016-0113296

(51) Int. Cl.
*G09G 5/14* (2006.01)
*G06F 3/0481* (2013.01)
*G06F 3/0482* (2013.01)

(52) U.S. Cl.
CPC .............. *G09G 5/14* (2013.01); *G06F 3/0482* (2013.01); *G06F 3/04815* (2013.01); *G06F 2203/04802* (2013.01); *G06F 2203/04803* (2013.01); *G09G 2340/04* (2013.01); *G09G 2340/14* (2013.01)

(58) Field of Classification Search
CPC .. G09G 5/14; G09G 2340/14; G06F 3/04815; G06F 3/0482; G06F 2203/04802
See application file for complete search history.

(56) References Cited

U.S. PATENT DOCUMENTS

| | | | |
|---|---|---|---|
| 2008/0122922 A1 | 5/2008 | Geng | |
| 2008/0150709 A1* | 6/2008 | Yamamoto | B60K 35/00 340/441 |
| 2012/0086771 A1* | 4/2012 | Wang | A61B 1/00009 348/36 |
| 2013/0321461 A1* | 12/2013 | Filip | G06F 3/011 345/632 |
| 2015/0222841 A1* | 8/2015 | Kwak | H04N 5/23293 348/239 |
| 2016/0028997 A1 | 1/2016 | Kanai et al. | |
| 2016/0132991 A1 | 5/2016 | Fukushi | |

FOREIGN PATENT DOCUMENTS

| | | |
|---|---|---|
| JP | 2016-25640 | 2/2016 |
| KR | 10-2009-0000828 | 1/2009 |
| KR | 10-2016-0003553 | 1/2016 |
| KR | 10-2016-0018719 | 2/2016 |
| KR | 10-2016-0054152 | 5/2016 |

* cited by examiner

Primary Examiner — Tadesse Hailu
(74) Attorney, Agent, or Firm — Staas & Halsey LLP

(57) ABSTRACT

A display apparatus includes a display configured to display an image, an input unit configured to receive a selection of a panoramic image, and a processor configured to control the display to display a first split screen which displays a first viewpoint of the panoramic image, and a second split screen which is disposed below the first split screen and displays a horizontally flipped second viewpoint of the panoramic image, the second viewpoint being in an opposite direction to the first viewpoint.

17 Claims, 14 Drawing Sheets

DISPLAY APPARATUS AND CONTROLLING METHOD THEREOF

CROSS-REFERENCE TO RELATED APPLICATIONS

This application claims priority from Korean Patent Application No. 10-2016-0113296, filed in the Korean Intellectual Property Office on Sep. 2, 2016, the disclosure of which is incorporated herein by reference in its entirety.

BACKGROUND

1. Field

Aspects of the exemplary embodiments relate to a display apparatus and a controlling method thereof, and more particularly, to a display apparatus capable of enable a user to view a panoramic image in various modes, and a controlling method thereof.

2. Description of the Related Art

Due to the development of electronic technology, various types of electronic products have been developed and popularized. In particular, various photographic devices such as a mobile phone, a notebook PC, and a PDA have been widely used in most ordinary households.

As the use of image devices has increased, the user needs for more diverse functions have also increased. As a result, the effort of each manufacturer to meet user needs has increased, and new products having new functions that had not been available have been emerging one after another.

Recently, a photographing apparatus having a function of generating a panoramic image by using an image photographed at a plurality of viewpoints has been developed. Such panoramic images were generally viewed by moving the viewpoint through a professional virtual reality (VR) device or a mobile phone.

However, when a panoramic image is reproduced in a device having a fixed screen area such as a TV, only a part of the panoramic image is displayed on the screen, so that it is insufficient to appreciate the panoramic image providing a wide view.

SUMMARY

Additional aspects and/or advantages will be set forth in part in the description which follows and, in part, will be apparent from the description, or may be learned by practice of the invention.

Exemplary embodiments provide a display apparatus capable of enabling a user to view a panoramic image in various modes, and a controlling method thereof.

The foregoing and/or other features and utilities of the present general inventive concept may be achieved by providing a display apparatus including a display configured to display an image, an input unit configured to receive a selection of a panoramic image, and a processor configured to control the display to display a first split screen for displaying an image of a first viewpoint of the panoramic image and a second split screen disposed below the first split screen and displaying a horizontally flipped image of a second viewpoint that is in an opposite direction to the first viewpoint.

The display is capable of displaying a panoramic image in a plurality of modes, and the processor may, in a first mode among the plurality of modes, control the display to display the first split screen and the second split screen, and in a second mode among the plurality of modes, control the display to display a third split screen for displaying an image of a first viewpoint of the panoramic image, a fourth split screen that is disposed below the third split screen and displays an image of a third viewpoint that is left on a basis of the first viewpoint, a fifth split screen that is disposed on a left side of the fourth split screen and displays an image of a third viewpoint that is left on a basis of the first viewpoint, and a sixth split screen that is disposed on a right side of the fourth split screen and displays an image at a fourth viewpoint that is right on a basis of the first viewpoint.

The processor may, in a third mode among the plurality of modes, control the display to display a first thumbnail image corresponding to an image of a first viewpoint of the panoramic image and corresponds to an image of a second viewpoint that is an opposite direction to the first viewpoint, a third thumbnail image that is disposed on a left side of the second thumbnail image and corresponds to an image of a third viewpoint that is left on a basis of the first viewpoint, and a fourth thumbnail image that is disposed on a right side of the second thumbnail image and corresponds to an image of a fourth viewpoint that is right on a basis of the first viewpoint, and in response to any one of the first to fourth thumbnail images being selected, control the display to display an image of a viewpoint corresponding to the selected thumbnail image on an entire screen.

The processor may control the display to display a circular UI surrounded by the first to fourth thumbnail images, and control the display to display an area of the circular UI corresponding to a viewpoint of an image displayed on the entire screen in a manner distinct from other areas of the circular UI.

The input unit may receive a selection of one of the plurality of modes, and the processor is further configured to control the display to display the panoramic image in the selected mode.

The processor may control the display to display a UI element to receive a selection of one of the plurality of modes.

The processor may control the display to display a toggle UI element for receiving a command to switch from a currently selected mode to another predetermined mode.

The processor may determine one of the plurality of modes based on at least one of a title and metadata of the panoramic image, and control the display to display the panoramic image in the determined mode.

The processor may, in response to a viewpoint movement command being received through the input unit in the first mode, move a viewpoint of an image displayed on the first split screen, and control the display to move a viewpoint of an image displayed on the second split screen in correspondence with a viewpoint moved in the first split screen.

The processor may display an image of a viewpoint of the panoramic image on an entire screen in a fourth mode of the plurality of modes, in response to a capture command being received through the input unit, capture an image displayed on the entire screen to generate a captured image, and control the display to display a thumbnail image of the captured image together with the image displayed on the entire screen.

The processor may, in response to a viewpoint movement command being received through the input unit, control the display to move a viewpoint of the image displayed on the entire screen while maintaining a display of the thumbnail image.

The processor may, in response to the displayed thumbnail image being selected, control the display to display an image of a viewpoint corresponding to the selected thumbnail image on an entire screen.

The panoramic image may be a panoramic image having a 360-degree view.

A controlling method of a display apparatus includes receiving a selection of a panoramic image, and displaying a first split screen which displays an image of a first viewpoint of the panoramic image, and a second split screen which is disposed below the first split screen and displays a horizontally flipped image of a second viewpoint that is in opposite direction to the first viewpoint.

The display apparatus is capable of displaying a panoramic image in a plurality of modes, and the controlling method of the display apparatus may further include, in a first mode among the plurality of modes, displaying the first split screen and the second split screen, and in a second mode among the plurality of modes, displaying a third split screen which displays an image of a first viewpoint of the panoramic image, a fourth split screen which is disposed below the third split screen and displays an image of a second viewpoint that is an opposite direction to the first viewpoint, a fifth split screen which is disposed on a left side of the fourth split screen and displays an image of a third viewpoint that is left on a basis of the first viewpoint, and a sixth split screen which is disposed on a right side of the fourth split screen and displays an image of a fourth viewpoint that is right on a basis of the first viewpoint.

The controlling method of the display apparatus may further include, in a third mode among the plurality of modes, displaying a first thumbnail image corresponding to an image of a first viewpoint of the panoramic image, a second thumbnail image which is disposed below the first thumbnail image and corresponds to an image of a second viewpoint in an opposite direction to the first viewpoint, a third thumbnail image which is disposed on a left side of the second thumbnail image and corresponds to an image of a third viewpoint that is left on a basis of the first viewpoint, and a fourth thumbnail image which is disposed on a right side of the second thumbnail image and corresponds to an image of a fourth viewpoint that is right on a basis of the first viewpoint, and in response to one of the first to fourth thumbnail images being selected, displaying an image of a viewpoint corresponding to the selected thumbnail on an entire screen.

The controlling method of the display apparatus may further include, in response to a viewpoint movement command being received in the first mode, moving a viewpoint of an image displayed on the first split screen, and moving a viewpoint of an image displayed on the second split screen in correspondence with a viewpoint moved in the first split screen.

The controlling method of the display apparatus may further include displaying an image of a viewpoint of the panoramic image on an entire screen in a fourth mode among the plurality of modes, in response to a capture command being received, generating a captured image by capturing an image displayed on the entire screen, and displaying a thumbnail image of the captured image together with the image displayed on the entire screen.

The controlling method of the display apparatus may further include, in response to a viewpoint movement command being received, moving a viewpoint of the image displayed on the entire screen while maintaining a display of the thumbnail image.

Regarding a computer readable recording medium comprising a program for executing a controlling method of a display apparatus, the controlling method includes receiving a selection of a panoramic image, and displaying a first split screen which displays an image of a first viewpoint of the panoramic image, and a second split screen which is disposed below the first split screen and displays a horizontally flipped image of a second viewpoint that is in an opposite direction to the first viewpoint.

BRIEF DESCRIPTION OF THE DRAWINGS

The above and other aspects of one or more exemplary embodiments will become more apparent by reference to specific embodiments thereof which are illustrated in the appended drawings. Understanding that these drawings depict only exemplary embodiments of the disclosure and are not therefore to be considered to be limiting of the scope of the disclosure, the principles herein are described and explained with additional specificity and detail through the use of the accompanying drawings, in which.

DETAILED DESCRIPTION

Figure 1:
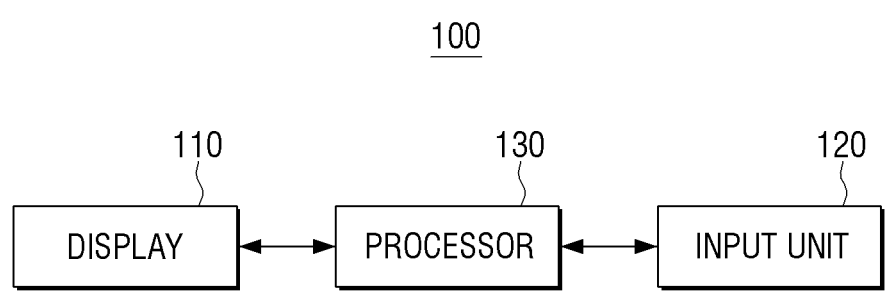
FIG. 1 is a block diagram for explaining a configuration of a display apparatus according to an embodiment of the present disclosure.

Hereinafter, the terms used in exemplary embodiments will be briefly explained, and exemplary embodiments will be described in greater detail with reference to the accompanying drawings.

The terms used in the example embodiments of the present disclosure are general terms which are widely used now and selected considering the functions of the present disclosure. However, the terms may vary depending on the intention of a person skilled in the art, a precedent, or the advent of new technology. In addition, in a specified case, the term may be arbitrarily selected. In this case, the meaning of the term will be explained in the corresponding description. Therefore, the terms used in the present disclosure should be defined based on the meanings of the terms and the descriptions made herein, rather than the names of the terms.

The exemplary embodiments may vary, and may be provided in different exemplary embodiments. Specific exemplary embodiments will be described with reference to accompanying drawings and detailed explanation. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

In the present disclosure, relational terms such as first and second, and the like, may be used to distinguish one entity from another entity, without necessarily implying any actual relationship or order between such entities. In embodiments of the present disclosure, relational terms such as first and second, and the like, may be used to distinguish one entity from another entity, without necessarily implying any actual relationship or order between such entities.

It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In an example embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor except for 'modules' or 'units' that should be realized in a specific hardware.

The above and other aspects of the present disclosure will become more apparent by describing in detail exemplary embodiments thereof with reference to the accompanying drawings. However, exemplary embodiments may be realized in a variety of different configurations, and not limited to descriptions provided herein. Further, those that are irrelevant with the description are omitted so as to describe exemplary embodiments more clearly, and similar drawing reference numerals are used for the similar elements throughout the description.

Certain exemplary embodiments are described in higher detail below with reference to the accompanying drawings.

FIG. 1 is a block diagram for explaining a configuration of a display apparatus according to an embodiment of the present disclosure. The display apparatus 100 includes a display 110, an input unit 120, and a processor 130.

The display apparatus 100 is an apparatus for displaying an image, and may be, for example, a TV, a tablet PC, a notebook PC, a desktop PC, a projector, or the like.

The display 110 is configured to display various screens. The display 110 may be a liquid crystal display (LCD,) and may be a cathode ray tube (CRT), a plasma display panel (PDP), an organic light emitting diode (OLED), a transparent OLED (TOLED) or the like. Also, the display 110 may be implemented as a touch screen capable of sensing a user's touch operation.

The display 110 may display a panoramic image in a plurality of modes.

The panoramic image is an image having a plurality of viewpoints, for example, an image generated by combining a plurality of images photographed while moving one camera, or an image generated by combining a plurality of images photographed at different viewpoints of the same space with a plurality of cameras, or an image captured by one camera having a wide angle of view. In addition, the present disclosure is not limited to images photographed by a camera. For example, content artificially generated, such as a game image, may correspond to a panoramic image. On the other hand, an image is a concept that can include both a still image and a moving image.

Among the panoramic images, there is a panoramic image having a 360-degree view. A panoramic image having a 360-degree view means an image in which the start and end are the same, and may be called various names such as a spherical image and an omnidirectional image. In particular, according to the present disclosure, a panoramic image having a 360-degree view may be viewed in various modes.

The input unit 120 is a configuration for receiving a user operation command.

The input unit 120 may receive selection of a panoramic image to be displayed and receive selection of one of a plurality of modes associated with display of the panoramic image.

The input unit 120 may be implemented as various input devices such as a button, a pointing device, a mouse, a keyboard, a voice recognition device, a motion recognition device, a touch panel, or the like. Also, the input unit 120 may include a remote control signal receiving unit that receives a control signal corresponding to a user operation from a remote control for controlling the display apparatus 100. The remote control signal receiving unit may include, for example, a photodiode for receiving an IR signal generated in a remote control device.

The processor 130 is a configuration for controlling the overall operation of the display apparatus 100. The processor 130 may include a CPU, a RAM, a ROM, and a system bus. In the above description, the processor 130 includes only one CPU. However, the processor 130 may be implemented as a plurality of CPUs (DSP, MPU, etc.) The processor 130 may be implemented as a micro computer (MICOM), an application specific integrated circuit (ASIC), or the like.

The processor 130 may control the display 110 to display a panoramic image in various modes.

In the first mode of the plurality of modes, the processor 130 may control the display 110 to display an image of a viewpoint of the panoramic image on the entire screen.

In the second mode of the plurality of modes, the processor 130 may control the display 110 to display a first split screen for displaying an image of a first viewpoint of the panoramic image and a second split screen, which is disposed below the first split screen and displays a horizontally flipped image of a second viewpoint, which is in the opposite direction to the first viewpoint.

In the third mode of the plurality of modes, the processor 130 may control the display 110 to display a first split screen for displaying an image of a first viewpoint of the panoramic image, a second split screen arranged below the first split screen and displaying an image of a second viewpoint in a direction opposite to the first viewpoint, a third split screen that is disposed on the left side of the second split screen and displays an image of a third viewpoint that is left on the basis of the first viewpoint, and a fourth split screen that is disposed on the right side of the second split screen and displays an image of a fourth viewpoint that is right on the basis of the first viewpoint.

In the fourth mode of the plurality of modes, the processor 130 may control the display 110 to display a first thumbnail image corresponding to the image of the first viewpoint in the panoramic image, a second thumbnail image arranged below the first thumbnail image and corresponding to an image of a second viewpoint in a direction opposite to the first viewpoint, a third thumbnail image that is disposed on the left side of the second thumbnail image and corresponds to an image of a third viewpoint that is left on the basis of the first viewpoint, and a fourth thumbnail that is disposed on the right side of the second thumbnail image and corresponds to an image of a fourth viewpoint that is right on the basis of the first viewpoint. If any one of the displayed first through fourth thumbnail images is selected, the processor 130 may control the display 110 to display an image of a viewpoint corresponding to the selected thumbnail image on the entire screen.

In the fifth mode among the plurality of modes, the processor 130 may control the display 110 to display the entire panoramic image on one screen. An example of the case where the entire panoramic image is displayed on one screen is shown on the screen 610 in FIG. 6.

Hereinafter, the plurality of modes described above will be described in more detail with reference to FIG. 2.

Figure 2:
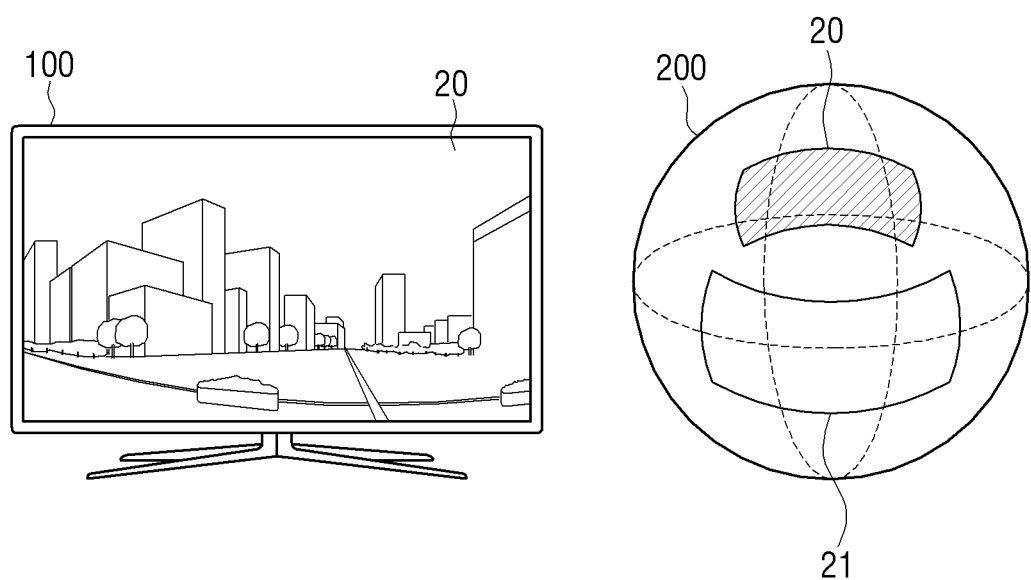
FIGS. 2-5 are views for explaining various modes provided by the display apparatus in relation to a panoramic image display.

FIG. 2 shows an example of a panoramic image displayed in the first mode.

The right picture of FIG. 2 is shown to help understand a panoramic image (spherical image) having a 360-degree view, and shows the image 20 of the first viewpoint and the image 21 of the second viewpoint opposite to the image 20 of the panoramic image 200. For example, assuming that the panoramic image 200 is photographed in a 360-degree direction by a camera disposed on a mound of a baseball field, the image 20 of the first viewpoint is the image of the home plate and the image 21 of the second viewpoint is the image of the second base.

Referring to the left picture of FIG. 2, the display apparatus 100 may display the image 20 of a viewpoint of the panoramic image on the entire screen in the first mode among the plurality of modes described above.

Figure 3A:
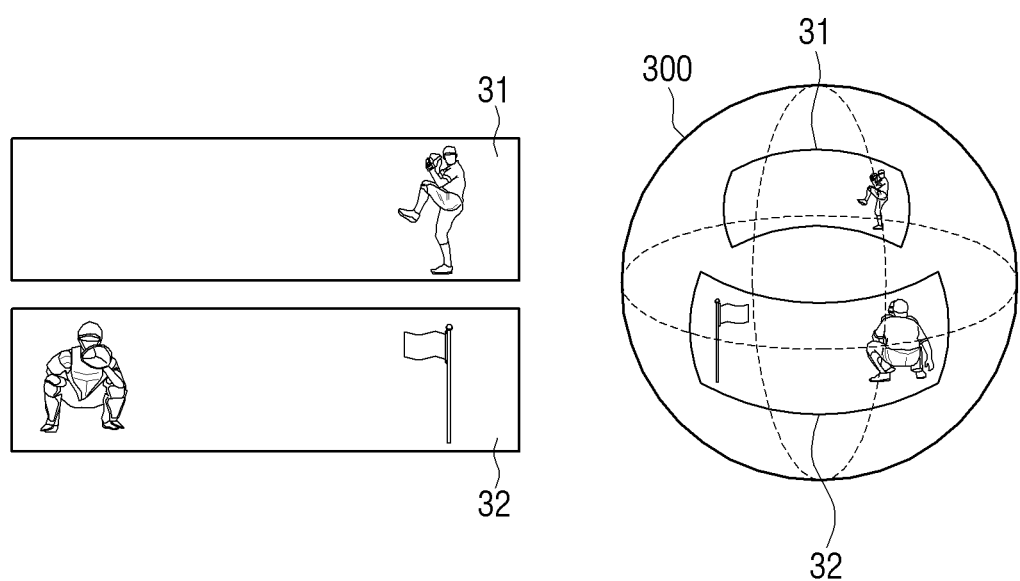
Figure 3B:
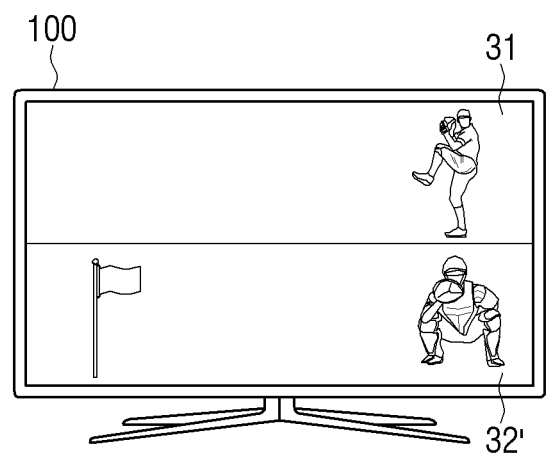

FIGS. 3A-3B are diagrams for explaining the second mode described above.

Referring to FIG. 3A, the panoramic image 300 is an image photographed at 360 degrees by a camera disposed between a pitcher and a catcher in a situation where the pitcher and the catcher are playing catch. For the sake of understanding, a situation in which the actual pitcher and the catcher are viewed from behind the catcher is shown superimposed on the panoramic image 300. Therefore, although the front view of the pitcher and the rear view of the catcher are shown in the picture superimposed on the panoramic image 300, the front view of the pitcher and the front view of the catcher are photographed in the image photographed by the camera disposed therebetween. Therefore, as shown in the left side of FIG. 3A, the image 31 of the first viewpoint is the image of the pitcher's front view and the image 32 of the second viewpoint is the image of the catcher's front view.

Referring to FIG. 3B, in the second mode, the display apparatus 100 displays a first split screen for displaying an image of the first viewpoint 31 in the panoramic image 300 and a second split screen which is disposed below the first split screen and displays an image 32' generated by horizontally flipping an image of the second viewpoint, the second viewpoint being in an opposite direction to the first viewpoint.

If the image 32 of the second viewpoint is displayed without being horizontally flipped, it will be displayed as shown in the left picture of FIG. 3A. If the panoramic image 300 is a moving image of a situation in which the catcher and the pitcher exchange balls, the ball appears on the right side in the image 31 of the first viewpoint and on the left side in the image 32 of the second viewpoint. The problem is that the pitcher and catcher do not seem to throw the ball facing each other. However, as shown in FIG. 3B, when the image 32' in which the image 32 of the second viewpoint is flipped horizontally is displayed, the above problem can be solved.

On the other hand, in the above-described example, the image in the second split screen located at the lower end is displayed in the left-right reversed manner, but it is also possible that the image in the first split screen positioned at the upper end is reversed. That is, if only one of the two images is reversed left and right, the above-described problem can be solved.

Meanwhile, in the second mode, when the viewpoint movement command is received through the input unit 110, the processor 130 may move the viewpoint of the image displayed on the first split screen, and control the display 110 to move the viewpoint of the image displayed on the second split screen in accordance with the moving viewpoint of the first split screen.

The input of the viewpoint movement command may be performed by inputting a control signal generated in response to an operation of pressing an arrow key provided on a remote controller for controlling the display apparatus 100 through the input unit 110.

Figure 4:
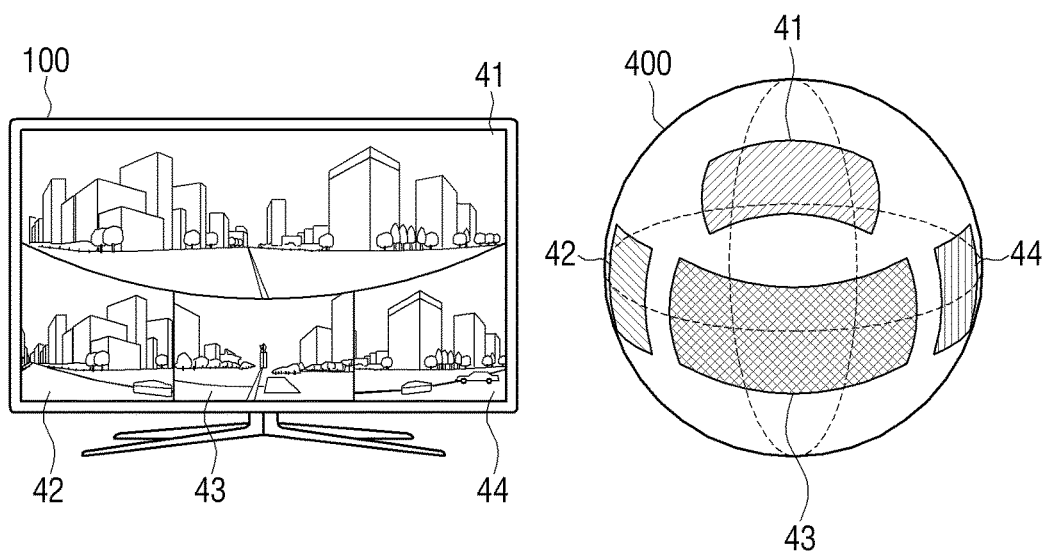

FIG. 4 shows an example of a panoramic image displayed in the third mode.

The right picture of FIG. 4 shows an image 41 of the first viewpoint, an image 43 of the second viewpoint, an image 42 of the third viewpoint, and an image 44 of the fourth viewpoint in a panoramic image 400. For example, assuming that the panoramic image 500 is photographed at 360 degrees through a camera disposed on the pitcher plate of the baseball field, the image 41 of the first viewpoint is the image of the home plate side, the image 43 of the second viewpoint is the image taken at the second base side, and the image 42 of the third viewpoint is the image of the first base, and the image 44 of the fourth viewpoint is the image of the third base.

In the third mode, the display apparatus 100 may display a first split screen for displaying an image 41 of the first viewpoint of the panoramic image 400, a second split screen disposed below the first split screen and displaying the image 43 of the second viewpoint in the reverse direction at the first viewpoint, a third split screen that is disposed on the left side of the second split screen and displays the image 42 of the third viewpoint that is left on the basis of the first viewpoint, and a fourth split screen that is disposed on the right side of the second split screen and displays the image 44 of the fourth viewpoint located on the right side on the basis of the first viewpoint.

In this case, each split screen may include a text indicating a viewpoint of each of the images. For example, in the case of FIG. 4, the first split screen displayed at the top may include the text "front" or "0°", and the second split screen arranged at the bottom middle may include "back" or "180°". Also, the third split screen arranged at the bottom left may include the text "left" or "270°", and the fourth split screen arranged at the bottom right may include the text "right" or "90°".

When images of a plurality of viewpoints in the panoramic image are displayed on one screen in the display apparatus 100, the positions of the respective split screens have a similar directionality to the positions of actual objects in the panorama image as in the third mode. Thus, there is an advantage that the user can feel more natural space.

Meanwhile, in the third mode, when the viewpoint movement command is received through the input unit 110, the processor 130 may move the viewpoint of the image displayed on the first split screen, and control the display 110 to move the viewpoints of the images displayed on the second to fourth split screens in accordance with the viewpoint moved in the first split screen.

The input of the viewpoint movement command may be performed by inputting a control signal generated in response to an operation of pressing an arrow key provided on a remote controller for controlling the display apparatus 100 through the input unit 110.

Figure 5:
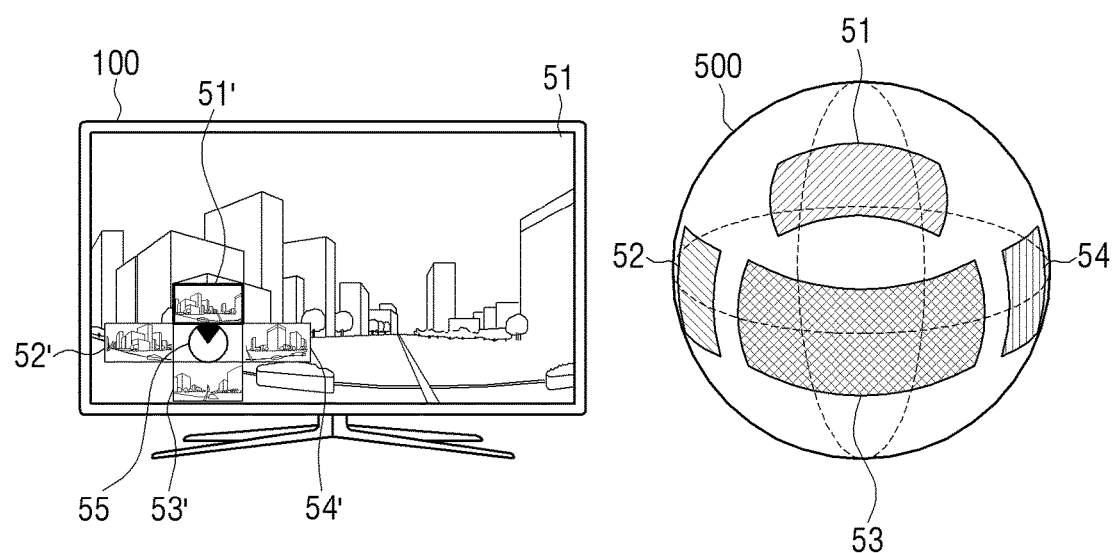

FIG. 5 shows an example of a panoramic image displayed in the fourth mode among the plurality of modes described above.

Referring to FIG. 5, in the fourth mode of the plurality of modes, the display apparatus 100 may display a first thumbnail image 51' corresponding to the image 51 of the first viewpoint in the panoramic image 500, a second thumbnail image 53' arranged below the first thumbnail image 51' and corresponding to an image 53 of a second viewpoint in a direction opposite to the first viewpoint, a third thumbnail image 52' that is disposed on the left side of the second thumbnail image 53' and corresponds to an image 52 of a third viewpoint that is left on the basis of the first viewpoint, and a fourth thumbnail image 54' that is disposed on the right side of the second thumbnail image 53' and corresponding to an image 54 of a fourth viewpoint that is right on the basis of the first viewpoint.

The first through fourth thumbnail images may occupy a part of the screen and displayed. In addition, the display apparatus 100 may display an image of one viewpoint of the panoramic image 500, for example, an image 51 of the first viewpoint as shown in FIG. 5 on the entire screen.

The processor 130 may control the display 110 to display the circular UI 55 surrounded by the first to fourth thumbnail images 51', 52', 53', and 54', and control the display 110 to display one area of the circular UI 55 corresponding to the image 51 of the viewpoint displayed on the full screen in a manner distinct from other areas. For example, as shown in FIG. 5, one area in the circular UI 55 may be displayed in black differently from the other areas. In addition, the processor 130 may display the first thumbnail image 51' corresponding to the image 51 of the viewpoint displayed on the entire screen differently from other thumbnail images. For example, as shown in FIG. 5, the border of the first thumbnail image 51' may be displayed more darkly.

When any one of the first through fourth thumbnail images 51', 52', 53', and 54' is selected, the processor 130 may display an image of a viewpoint corresponding to the selected thumbnail image on the entire screen. For example, as shown in FIG. 5, in a situation where the image 51 of the first viewpoint is being displayed on the full screen, when the second thumbnail image 53' is selected, the image 53 of the second viewpoint may be displayed on the full screen.

For example, a direction key and an OK button provided on the remote controller for controlling the display apparatus 100 may be used to select the first through fourth thumbnail images.

The various modes described above may be manually selected by the user or automatically selected according to the properties of the panoramic image.

When manually selected, the input unit 120 may select one of the plurality of modes and the processor 130 may control the display 110 to display the panoramic image in the selected mode.

The display apparatus 100 may display a UI element for receiving a mode selection from the user. For example, when a panoramic image is selected through the input unit 120, the processor 130 may control the display 110 to display a UI element for selecting one of a plurality of modes. In this case, a plurality of UI elements corresponding to each mode may be displayed. In this case, according to one embodiment, the remote controller for controlling the display apparatus 100 may have a plurality of buttons corresponding to each of the plurality of UI elements, and the user may select one of the plurality of buttons by an operation of selecting any one of the plurality of buttons.

Alternatively, the processor 130 may control the display 110 to display a toggle UI element for receiving a command to switch from the currently selected mode to another predetermined mode.

Figure 6:
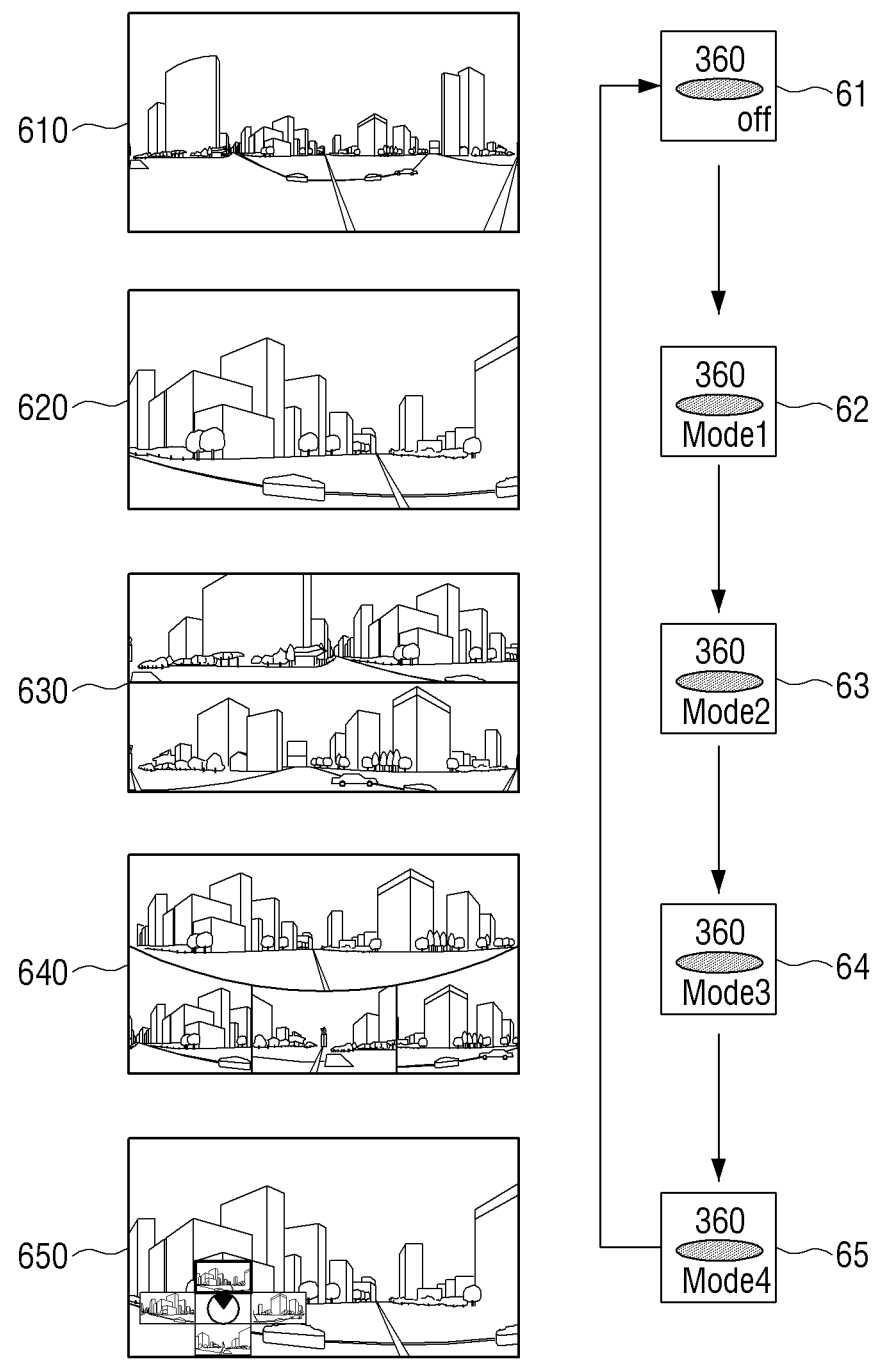
FIG. 6 is a view for explaining a method of selecting one of a plurality of modes related to a panoramic image display according to an embodiment of the present disclosure.

The toggle UI element will be described with reference to FIG. 6. Any one of the graphic objects 61, 62, 63, 64, and 65 corresponding to each mode shown in FIG. 6 may be displayed in the toggle UI element according to the current mode. In the first mode, the toggle UI element includes a first graphic object 62. In this case, when the toggle UI element is selected, the panoramic image 630 according to the second mode is displayed while changing from the first mode to the second mode, and the first graphic object 62 in the toggle UI element is changed to the second graphic object 63. When the toggle UI element is selected again, the panoramic image 640 according to the third mode is displayed while changing from the second mode to the third mode, and the second graphic object 63 in the toggle UI element is changed to the third graphic object 64. When the toggle UI element is selected again, the panoramic image 650 according to the fourth mode is displayed while changing from the third mode to the fourth mode, and the third graphic object 64 in the toggle UI element is changed to the fourth graphic object 65. When the toggle UI element is selected again, the panoramic image 610 according to the fifth mode is displayed while changing from the fourth mode to the fifth mode, and the fourth graphic object 65 in the toggle UI element is changed to the fifth graphic object 61. When the toggle UI element is selected again, the panoramic image 620 according to the first mode is displayed while changing from the fifth mode to the first mode, and the fifth graphic object 61 in the toggle UI element is changed to the first graphic object 62.

Thus, the user can change the mode by selecting the toggle UI element several times until the mode is switched to the desired mode. According to the present embodiment, in order to select a mode, only one toggle UI element is displayed without displaying a plurality of UI elements corresponding to each of the plurality of modes. Therefore, the space occupied by the UI elements in a predetermined screen space can be minimized.

As an example of a method of selecting the toggle UI element displayed on the display 110, the user may press a specific button corresponding to the toggle UI element on the remote controller for controlling the display apparatus 100. Alternatively, the UI elements displayed on the display 110 may be selected by moving the cursor using a direction key provided on the remote controller. When the cursor is positioned on the toggle UI element and the user selects an OK button (mainly located at the center of the direction key) provided on the remote controller, the toggle UI element can be selected.

According to another embodiment of the present disclosure, the user does not need to select a mode directly as described above, and the display apparatus 100 may automatically display the panoramic image in the most appropriate mode according to the property or genre of the panoramic image.

Specifically, the processor 130 may determine one of the plurality of modes based on at least one of the title and metadata of the panoramic image, and control the display 110 to display the panoramic image in the determined mode.

The processor 130 may extract keywords from the metadata or the title of the panoramic image, determine the attributes of the panoramic image based on the extracted keywords, and display the panoramic image in a matching mode.

For example, when at least one of the keywords "Air", "Balloon", "Jump", "Skydiving", "Drone", "Helicopter", "Airplane", "Aerial" and "Mountain" is extracted from the metadata or title of the panoramic image selected by the user for viewing the panoramic image, the processor 130 may determine the third mode described above with reference to FIG. 4, which is suitable for displaying a landscape or a full foreground by providing a four-way view, among a plurality of modes, and display the panoramic image in the third mode.

As another example, when at least one of the keywords "Rollercoaster", "Ski", "Racing", "Car", "Bike", and "Ride" is extracted from the metadata or title of the panoramic image selected by the user for viewing the panoramic image, the processor 130 determines the second mode described above with reference to FIG. 3B, which is suitable for the case where the camera is moved fast with directionality by providing a front-back two-directional view, among a plurality of modes, and display the panoramic image in the second mode.

The above-described keywords are stored in the storage of the display apparatus 100. When keywords other than the keywords stored in the display apparatus are extracted, the processor 130 may determine the first mode described above with reference to FIG. 2, which is a general VR playback screen, among a plurality of modes, and display the panoramic image in the first mode.

Thus, the user can select another mode even if the mode is determined automatically after identifying the property of the panoramic image and the panoramic image is displayed.

FIGS. 7A-7E are views for explaining an embodiment of the present disclosure relating to panoramic image capturing.

Figure 7A:
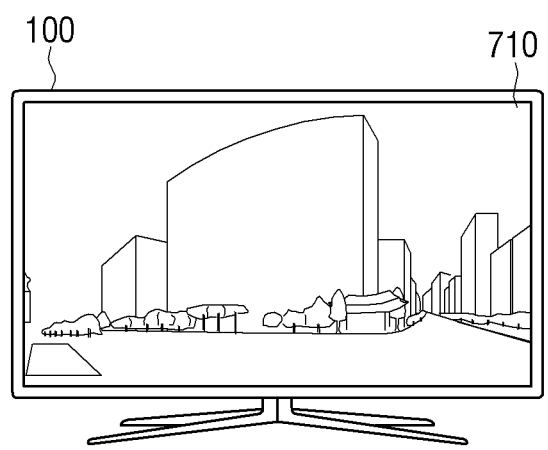
FIGS. 7A-7E are views for explaining viewpoint movement in a panoramic image according to an embodiment of the present disclosure.
Figure 7B:
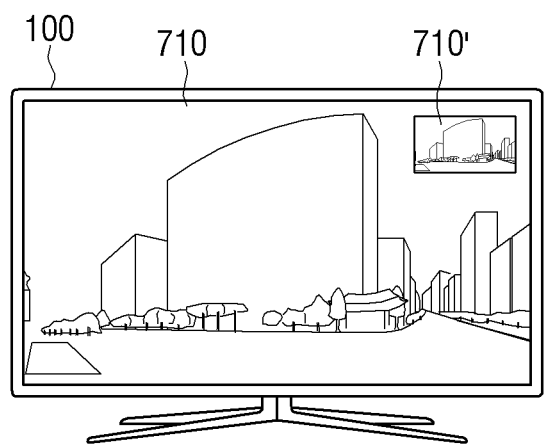

Referring to FIG. 7A, in the first mode, the display apparatus 100 may display an image 710 of the first viewpoint among the panoramic images on the entire screen. In this situation, when a capture command is inputted through the input unit 120, the processor 130 may generate a first captured image by capturing an image 710 of a first viewpoint displayed on the entire screen, and control the display 110 to display a first thumbnail image 710' of the first captured image together with the image 710 of the first viewpoint displayed on the entire screen as shown in FIG. 7B.

Figure 7C:
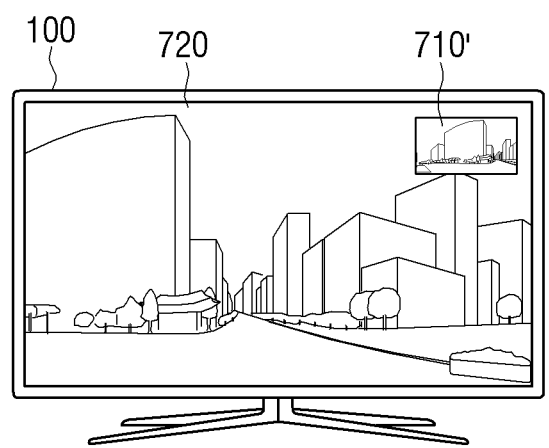

In this situation, when the viewpoint movement command is inputted through the input unit 120, as shown in FIG. 7C, the processor 130 may move the viewpoint of the image displayed on the entire screen, that is, move from the first viewpoint to the second viewpoint, while maintaining the display of the first thumbnail image 710', such that an image 720 of the second viewpoint is displayed in the display 110.

The input of the viewpoint movement command may be performed by inputting a control signal generated in response to an operation of pressing an arrow key provided on a remote controller for controlling the display apparatus 100 through the input unit 110.

When the first thumbnail image 710' is selected in the situation shown in FIG. 7C, the viewpoint of the image displayed on the entire screen returns from the second viewpoint to the first viewpoint, and the image 710 of the first viewpoint may be displayed on the entire screen.

Figure 7D:
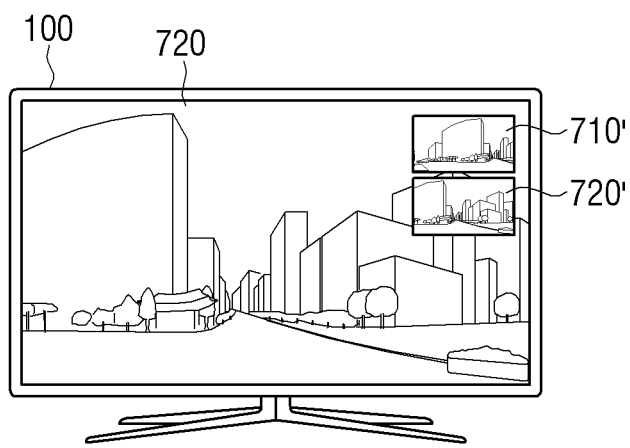

If a capture command is input through the input unit 120 in the situation shown in FIG. 7C, the processor 130 may capture an image 720 of the second viewpoint displayed on the entire screen to generate a second captured image, and as shown in FIG. 7D, control the display 110 to display the image 720 of the second viewpoint displayed on the entire screen and the first thumbnail image 710' that was being displayed together with a second thumbnail image 720' of the second captured image. That is, the thumbnail image is accumulated and displayed every time the capture is performed.

Figure 7E:
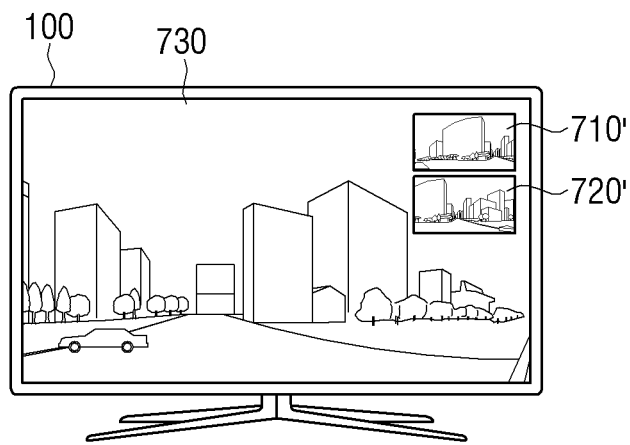

In this situation, when a viewpoint movement command is inputted through the input unit 120, as shown in FIG. 7E, the processor 130 may move the viewpoint of the image displayed on the entire screen, that is, from the second viewpoint to the third viewpoint, while maintaining the display of the first thumbnail image 710' and the second thumbnail image 720', such that an image 730 of the third viewpoint is displayed in the display 110.

Meanwhile, the input of the capture command may be performed by an operation of selecting a specific button provided on the remote controller for controlling the display apparatus 100. Alternatively, the display 110 may display a UI element for capturing, and when this UI element is selected, a capture command may be input. For example, a direction key and an OK button provided on the remote controller for controlling the display apparatus 100 may be used to select the first thumbnail image 710', the second thumbnail image 720', and the like.

According to the above-described embodiment, the user can enjoy the panoramic image of each viewpoint, capture the favorite viewpoint, and return to the viewpoint at any time.

Figure 8:
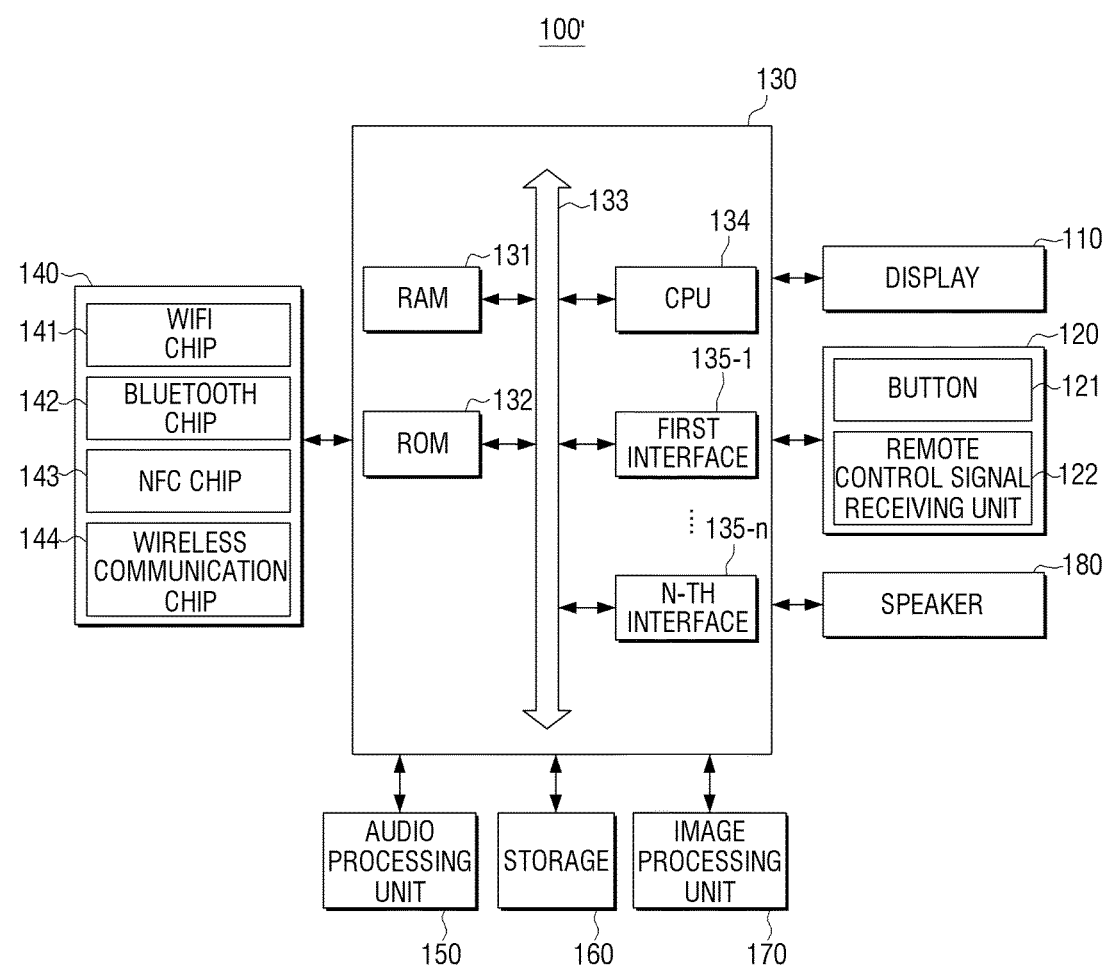
FIG. 8 is a block diagram for explaining a configuration of a display apparatus according to still another embodiment of the present disclosure.

FIG. 8 is a view for explaining various components that can be provided in the display apparatus 100' according to another embodiment of the present disclosure. In the meantime, in the description of the configuration of FIG. 8, the redundant description of the configuration overlapping with the configuration described above will not be provided.

Referring to FIG. 8, the display apparatus 100' includes a display 110, an input unit 120, a processor 130, a communicator 140, a storage 160, an audio processing unit 150, an image processing unit 170, and a speaker 180.

The display 110 may be implemented in various forms such as an LCD, a CRT, a PDP, an OLED, a TOLED, a thin film electroluminescent (TFE), or the like. The display 110 may be implemented as a touch screen as the case may be.

The communicator 140 is configured to communicate with various kinds of external devices in various communication methods. The communicator 140 includes various communication chips such as a Wi-Fi chip 141, a Bluetooth chip 142, an NFC chip 143, a wireless communication chip 144, and the like.

The Wi-Fi chip 141, the Bluetooth chip 142, and the NFC chip 143 communicate using WiFi, Bluetooth, and NFC, respectively. Of these, the NFC chip 143 means a chip operating in the NFC mode using the 13.56 MHz band among various RF-ID frequency bands such as 135 kHz, 13.56 MHz, 433 MHz, 860 to 960 MHz and 2.45 GHz. In the case of using the Wi-Fi chip 141 or the Bluetooth chip 142, various connection information such as SSID and session key may be transmitted and received first, and various information may be transmitted and received after communication is established by using it. The wireless communication chip 144 refers to a chip that performs communication according to various communication standards such as IEEE, ZigBee, Third Generation (3G), Third Generation Partnership Project (3GPP), and Long Term Evolution (LTE), and the like.

The storage 160 may be implemented as a nonvolatile memory, a volatile memory, a flash memory, a hard disk drive (HDD), or a solid state drive (SSD). The storage 160 is accessed by the processor 130 and the reading/recording/modification/deletion/update of data by the processor 130 can be performed. The storage 160 may be implemented not only as a storage medium in the display apparatus 100 but also as an external storage medium such as a USB or a Web server through a network.

The storage 160 may store various data such as programs such as O/S and various applications, user setting data, data generated during application execution, multimedia contents, and the like.

The audio processing unit 150 performs processing with respect to audio data. In the audio processing unit 150, various processes such as decoding or amplification of audio data, noise filtering, and the like may be performed. When the panoramic image including an audio signal is reproduced, the processor 150 controls the audio processing unit 150 to output the audio signal. The audio signal is provided to the speaker 180 and output.

The speaker 180 is a component for outputting various kinds of audio data processed by the audio processing unit 150, as well as various kinds of notification sounds and voice messages.

The image processing unit 170 serves to form a screen displayed on the display 110 as described above. The image processing unit 170 may include various components such as a codec, a parser, a scaler, a noise filter, a frame rate conversion module, and the like, for encoding or decoding video data.

The input unit 120 receives a user command. The input unit 120 may include a button 121 and a remote signal receiving unit 122. The button 121 may be various types of buttons such as a mechanical button, a touch pad, a wheel, and the like formed in an arbitrary area such as a front surface portion, a side surface portion, and a back surface portion of the outer surface of the main body of the display apparatus 100. The button 121 may be composed of one or a plurality of buttons. The power off, the power on, the channel up and down, and the volume up and down may be controlled through the button 121. The remote control signal receiving unit 183 receives a signal of a remote controller.

The processor 130 may be configured to control an overall operation of the display apparatus 100 using various programs stored in the storage 160.

The processor 130 includes RAM 131, ROM 132, a CPU 134, a first to an n-th interface 135-1~135-n and a bus 133. The RAM 131, the ROM 132, the CPU 134, the first through n interfaces 135-1 through 135-n, etc. may be connected to each other via a bus 133.

The first to the nth interface 135-1 to 135-n are connected to the above-described various elements. One of the interfaces may be a network interface which is connected with an external device via a network.

The CPU 134 may access the storage 160 and perform booting using the O/S stored in the storage 160. In addition, the CPU 133 may perform various operations using various programs, contents, data items, and so on which are stored in the storage 160.

The ROM 132 may store a command set, and the like for system booting. When the turn-on command is input and power is supplied, the CPU 134 copies the O/S stored in the storage 160 to the RAM 131 according to the command stored in the ROM 132, and executes O/S to boot the system. When the booting is completed, the CPU 134 copies various application programs stored in the storage 160 to the RAM 131, executes the application programs copied to the RAM 131, and performs various operations.

In addition, although not shown in FIG. 8, the display apparatus 100 may further include an external input unit. The external input unit can receive an image (e.g., a panoramic image and the like), audio (e.g., audio, music, etc.) and data (e.g., reproduction command). The external input unit may include one of a High-Definition Multimedia Interface (HDMI) port, a component input jack, a PC input port, and a USB input jack. The external input unit may include a combination of an HDMI input port, a component input jack, a PC input port, and a USB input jack.

Figure 9:
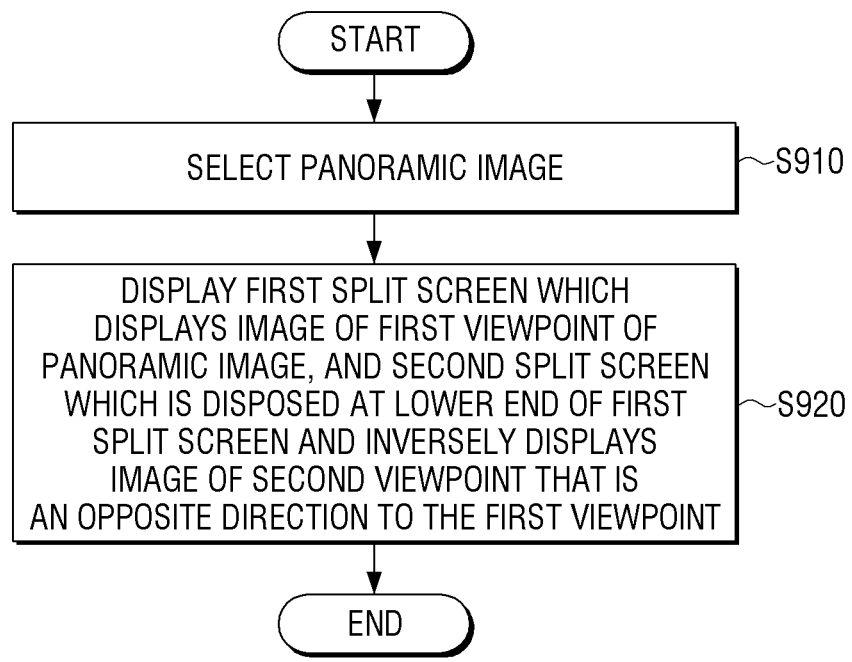
FIG. 9 is a flowchart illustrating a method of controlling a display apparatus according to an embodiment of the present disclosure.

FIG. 9 is a flowchart illustrating a method of controlling a display apparatus according to an embodiment of the present disclosure.

Referring to FIG. 9, first, the display apparatus 100 receives a selection of a panoramic image to be displayed on the display apparatus 100. (S910)

In addition, the display apparatus 100 includes a first split screen for displaying an image of a first viewpoint of the selected panoramic image and a second split screen that is disposed below the first split screen and displays a horizontally flipped image of the second viewpoint, which is in the opposite direction to the first viewpoint (S920)

In addition, as described above, the display apparatus 100 may display the panoramic image in various ways according to various modes related to the panoramic image display.

According to various embodiments of the present disclosure, a panoramic image can be viewed in various modes, and in particular, images of various viewpoints can be identified at a glance, and images are arranged on the screen so as to have similar directionality to real space. Accordingly, there is an advantage that the user can more intuitively perceive the position of the subject in the actual space when viewing a panoramic image with a wide field of view.

Meanwhile, the various embodiments described above can be implemented in a recording medium that can be read by a computer or similar device using software, hardware, or a combination thereof. In accordance with a hardware implementation, the embodiments described in this disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing other functions. In some cases, embodiments described herein may be implemented by processor 130 itself. According to a software implementation, embodiments such as the procedures and functions described herein may be implemented with separate software modules. Each of the software modules may perform one or more of the functions and operations described herein.

Meanwhile, the controlling method of a display apparatus according to various embodiments of the present disclosure described above may be stored in a non-transitory readable medium. The non-transitory readable medium may be installed in various apparatuses.

The non-transitory computer readable medium refers to a medium that stores data semi-permanently rather than storing data for a very short time, such as a register, a cache, a memory or etc., and is readable by an apparatus. In detail, programs for executing the aforementioned various methods may be stored in the non-transitory computer readable medium, for example, a compact disc (CD), a digital versatile disc (DVD), a hard disc, a Blu-ray disc, a universal serial bus (USB) flash drive, a memory card, a read only memory (ROM), and the like, and may be provided.

The foregoing embodiments and advantages are merely exemplary and are not to be construed as limiting the present disclosure. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A display apparatus, comprising:
   a display;
   an input device for receiving a selection of a panoramic image; and
   a processor configured to:
   control the display to display a first thumbnail image corresponding to a first viewpoint of the panoramic image, a second thumbnail image disposed below the first thumbnail image and corresponding to a second viewpoint in a direction opposite to the first viewpoint, a third thumbnail image disposed on a left side of the second thumbnail image and corresponding to a third viewpoint that is left on the basis of the first viewpoint, and a fourth thumbnail image disposed on a right side of the second thumbnail image and corresponding to a fourth viewpoint that is right on the basis of the first viewpoint; and
   in response to one of the first to fourth thumbnail images being selected, control the display to display an image of a viewpoint corresponding to the selected thumbnail image in a full-screen manner,
   wherein the processor is further configured to control the display to display a circular User Interface (UI) surrounded by the first to fourth thumbnail images, and control the display to display an area of the circular UI corresponding to the viewpoint of the image displayed in the full-screen manner in a manner distinct from other areas of the circular UI.

2. The display apparatus as claimed in claim 1, wherein the processor is further configured to control the display to display the panoramic image in one of a plurality of modes, and
   wherein the processor is further configured to:
   in a first mode among the plurality of modes, control the display to display a first split screen displaying a first viewpoint of the panoramic image and a second split screen disposed below the first split screen and displaying a horizontally flipped second viewpoint of the panoramic image, the second viewpoint being in an opposite direction to the first viewpoint; and
   in a second mode among the plurality of modes, control the display to display a third split screen displaying the first viewpoint of the panoramic image, a fourth split screen disposed below the third split screen and displaying the second viewpoint, a fifth split screen disposed on a left side of the fourth split screen and displaying a third viewpoint of the panoramic image left of the first viewpoint, and a sixth split screen disposed on a right side of the fourth split screen and displaying a fourth viewpoint of the panoramic image right of the first viewpoint.

3. The display apparatus as claimed in claim 2, wherein the input device is further configured to receive a selection of one of the plurality of modes, and wherein the processor is further configured to control the display to display the panoramic image in the selected mode.

4. The display apparatus as claimed in claim 3, wherein the processor is further configured to control the display to display a UI element to receive the selection of one of the plurality of modes.

5. The display apparatus as claimed in claim 3, wherein the processor is further configured to control the display to display a toggle UI element for receiving a command to switch from the selected mode to another mode among the plurality of modes.

6. The display apparatus as claimed in claim 2, wherein the processor is further configured to determine one of the plurality of modes based on at least one of a title and metadata of the panoramic image, and to control the display to display the panoramic image in the determined mode.

7. The display apparatus as claimed in claim 2, wherein the processor is further configured to, in response to a viewpoint movement command being received through the input device in the first mode, move a viewpoint displayed on the first split screen, and to control the display to move a viewpoint displayed on the second split screen in correspondence with the viewpoint moved in the first split screen.

8. The display apparatus as claimed in claim 2, wherein the processor is further configured to:
   display a viewpoint of the panoramic image in a full-screen manner in a fourth mode of the plurality of modes;
   in response to a capture command being received through the input device, capture the viewpoint displayed in the full-screen manner to generate a captured image; and
   control the display to display a thumbnail image of the captured image together with the viewpoint displayed in the full-screen manner.

9. The display apparatus as claimed in claim 8, wherein the processor is further configured to, in response to a viewpoint movement command received through the input device, control the display to move the viewpoint displayed in the full-screen manner while maintaining a display of the thumbnail image.

10. The display apparatus as claimed in claim 9, wherein the processor is further configured to, in response to the displayed thumbnail image being selected, control the display to display a viewpoint corresponding to the selected thumbnail image in a full-screen manner.

11. The display apparatus as claimed in claim 1, wherein the panoramic image is a panoramic image having a 360-degree view.

12. A method for controlling a display apparatus, the method comprising:
   receiving, by the display apparatus, a selection of a panoramic image;
   displaying, on the display apparatus, a first thumbnail image corresponding to a first viewpoint of the panoramic image, a second thumbnail image disposed below the first thumbnail image and corresponding to a second viewpoint in a direction opposite to the first viewpoint, a third thumbnail image disposed on a left side of the second thumbnail image and corresponding to a third viewpoint that is left on the basis of the first viewpoint, and a fourth thumbnail image disposed on a right side of the second thumbnail image and corresponding to a fourth viewpoint that is right on the basis of the first viewpoint; and in response to one of the first to fourth thumbnail images being selected, displaying a viewpoint corresponding to the selected thumbnail in a full-screen manner, wherein the displaying further includes controlling the display to display a circular User Interface (UI) surrounded by the first to fourth thumbnail images, and controlling the display to display an area of the circular UI corresponding to the viewpoint of the image displayed in the full-screen manner in a manner distinct from other areas of the circular UI.

13. The method as claimed in claim 12, wherein the display apparatus is configured to display the panoramic image in one of a plurality of modes, and wherein the method further comprises:

in a first mode among the plurality of modes, displaying a first split screen displaying a first viewpoint of the panoramic image, and a second split screen disposed below the first split screen and displaying a horizontally flipped second viewpoint of the panoramic image, the second viewpoint being in an opposite direction to the first viewpoint; and in a second mode among the plurality of modes, displaying a third split screen which displays the first viewpoint of the panoramic image, a fourth split screen which is disposed below the third split screen and displays the second viewpoint, a fifth split screen which is disposed on a left side of the fourth split screen and displays a third viewpoint of the panoramic image left of the first viewpoint, and a sixth split screen which is disposed on a right side of the fourth split screen and displays a fourth viewpoint of the panoramic image right of the first viewpoint.

14. The method as claimed in claim 13, further comprising:

in response to a viewpoint movement command being received in the first mode, moving a viewpoint displayed on the first split screen, and moving a viewpoint displayed on the second split screen in correspondence with the viewpoint moved in the first split screen.

15. The method as claimed in claim 13, further comprising:

displaying a viewpoint of the panoramic image in a full-screen manner in a fourth mode among the plurality of modes;

in response to a capture command being received, generating a captured image by capturing the viewpoint displayed in the full-screen manner; and displaying a thumbnail image of the captured image together with the viewpoint displayed in the full-screen manner.

16. The method as claimed in claim 15, further comprising:

in response to a received viewpoint movement command, moving the viewpoint displayed in the full-screen manner while maintaining a display of the thumbnail image.

17. A non-transitory computer readable recording medium comprising a program for executing a method for controlling a display apparatus, wherein the method comprises:

receiving a selection of a panoramic image; and displaying a first thumbnail image corresponding to a first viewpoint of the panoramic image, a second thumbnail image disposed below the first thumbnail image and corresponding to a second viewpoint in a direction opposite to the first viewpoint, a third thumbnail image disposed on a left side of the second thumbnail image and corresponding to a third viewpoint that is left on the basis of the first viewpoint, and a fourth thumbnail image disposed on a right side of the second thumbnail image and corresponding to a fourth viewpoint that is right on the basis of the first viewpoint; and in response to one of the first to fourth thumbnail images being selected, displaying a viewpoint corresponding to the selected thumbnail in a full-screen manner, wherein the displaying further includes controlling the display to display a circular User Interface (UI) surrounded by the first to fourth thumbnail images, and controlling the display to display an area of the circular UI corresponding to the viewpoint of the image displayed in the full-screen manner in a manner distinct from other areas of the circular UI.

* * * * *